(12) United States Patent
Kim

(10) Patent No.: US 9,428,165 B1
(45) Date of Patent: Aug. 30, 2016

(54) HYDRAULIC UNIT OF ELECTRONIC CONTROL BRAKE SYSTEM

(71) Applicant: MANDO CORPORATION, Pyeongtaek-si, Gyeonggi-do (KR)

(72) Inventor: Eun-Mi Kim, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/712,887

(22) Filed: May 14, 2015

(51) Int. Cl.
*B60T 8/40* (2006.01)
*B60T 8/36* (2006.01)
*B60T 17/04* (2006.01)
*B60T 13/14* (2006.01)

(52) U.S. Cl.
CPC .............. *B60T 8/363* (2013.01); *B60T 13/142* (2013.01); *B60T 17/043* (2013.01); *B60T 8/368* (2013.01); *B60T 8/4068* (2013.01)

(58) Field of Classification Search
CPC .......... B60T 8/363; B60T 8/368; B60T 3/40; B60T 3/4068; B60T 3/176; B60T 13/142; B60T 17/043
See application file for complete search history.

(56) References Cited

U.S. PATENT DOCUMENTS

| | | | | |
|---|---|---|---|---|
| 2007/0040445 A1* | 2/2007 | Otto | ...................... | B60T 8/4068 303/119.3 |
| 2007/0096553 A1* | 5/2007 | May | ........................ | B60T 8/368 303/119.3 |
| 2011/0036434 A1* | 2/2011 | Fischbach-Borazio | . | B60T 8/368 137/861 |
| 2011/0062776 A1* | 3/2011 | Fischbach-Borazio | . | B60T 8/368 303/116.1 |
| 2012/0177516 A1* | 7/2012 | Mayr | ..................... | B60T 8/368 417/437 |

FOREIGN PATENT DOCUMENTS

DE 10 2008 037 047 A1 11/2009

\* cited by examiner

*Primary Examiner* — Vishal Sahni
(74) *Attorney, Agent, or Firm* — McDermott Will & Emery LLP

(57) ABSTRACT

A hydraulic unit of an electronic control brake system including a modulator block; a pair of master cylinder connection portions; a first valve row having a plurality of first valve accommodation bores; a second valve row having a plurality of second valve accommodation bores; a pair of low-pressure accumulator bores arranged in a bottom side of the modulator block in the lateral direction; pump accommodation bores; a pair of shuttle valve ESV accommodation bores arranged between the first valve row and the second valve row; a pair of driving force control valve TC accommodation bores arranged between wheel cylinder connection portions formed in the modulator block and the first valve row; and a pair of high-pressure accumulator bores arranged in the modulator block in a longitudinal direction, wherein the pair of high-pressure accumulator bores are formed to have an arrangement parallel to the motor accommodation bores.

11 Claims, 3 Drawing Sheets

HYDRAULIC UNIT OF ELECTRONIC CONTROL BRAKE SYSTEM

BACKGROUND

1. Field

Embodiments of the present invention relate to a hydraulic unit, and more particularly, to a hydraulic unit of an electronic control brake system for adjusting brake pressure in the electronic control brake system through electronic control.

2. Description of the Related Art

Electronic control brake systems are used to effectively prevent a slipping phenomenon that may occur during a brake operation, sudden unintended acceleration, or a burst of speed of a vehicle. An electronic control brake system generally includes a booster device, a master cylinder, and a wheel cylinder of a brake system for a vehicle, a hydraulic unit for adjusting brake hydraulic pressure, and an electronic control unit for controlling the hydraulic unit.

The hydraulic unit includes a plurality of solenoid valves (introduction/discharge valves) for controlling brake hydraulic pressure transmitted to the wheel cylinder disposed at each wheel, a low-pressure accumulator for temporarily storing oil discharged from the wheel cylinder, a pair of pumps driven by a motor, and a shuttle valve and a driving force controlling valve that are disposed at a suction side and a discharge side of each of the pair of pumps, respectively. These components are built in a modulator block formed of aluminum (Al).

Also, in the modulator block of the hydraulic unit, a high-pressure accumulator is mounted on the discharge side of the pump so as to reduce pressure pulsation of the oil that is pressed and discharged by operations of the pumps.

In order to compactly install a plurality of components in the modulator block, ports for connecting a plurality of valve bores, pump bores, motor accommodation bores, accumulator bores, the master cylinder, and the wheel cylinder, and a plurality of flow paths that suggest a direction of a flow of the hydraulic pressure are processed.

However, an unused space except for a space in which a plurality of components are disposed, unnecessarily exists in a hydraulic unit according to the related art such that improvements in the arrangement structure of the components are required. In particular, when a high-pressure accumulator is installed in the modulator block, the modulator block is disposed while its size is increased, such that the size and weight of the hydraulic unit are increased and thus cost increases. The hydraulic unit having the high-pressure accumulator installed therein is disposed in Germany Patent No. 10-2008-037047.

The high-pressure accumulator installed in the hydraulic unit according to the related art is disposed at an upper side of a hydraulic pump to be parallel to the hydraulic pump so as to be directly connected to the hydraulic pump through one flow path, and an orifice is formed in bores of the high-pressure accumulator. The flow path that connects the high-pressure accumulator and the hydraulic pump is slantly formed in a diagonal direction. This is because there is a spatial limitation in the modulator block in forming general brake flow paths due to a problem of parallel arrangement of the high-pressure accumulator and the hydraulic pump and the position of the orifice formed in the bores of the high-pressure accumulator. That is, since general brake flow path and anti-lock braking system (ABS) flow path cannot be used in the same manner, flow paths are formed in the diagonal direction due to the spatial limitation in the modulator block while general brake flow paths and ABS flow paths are dualized. In this way, as the flow paths are slantly formed in the diagonal direction, it is difficult to perform processing of the flow paths compared to straight flow paths.

PRIOR ART DOCUMENT

Patent Document (Patent document) DE Patent No. 10-2008-037047 (Continental Teves), published on Nov. 19, 2009

SUMMARY

Therefore, it is an aspect of the present invention to provide a hydraulic unit of an electronic control brake system in which an installation position of a high-pressure accumulator that performs a noise and pulsation reducing function is improved so that the size of a modulator block is optimized and flow paths formed in the modulator block are configured as straight flow paths.

Additional aspects of the invention will be set forth in part in the description which follows and, in part, will be obvious from the description, or may be learned by practice of the invention.

In accordance with one aspect of the present invention, a hydraulic unit of an electronic control brake system including a modulator block on which components including a plurality of normal open/normal closed (NO/NC) valves for adjusting brake hydraulic pressure supplied to wheels of a vehicle, a driving force control valve, a shuttle valve, a low-pressure/high-pressure accumulator, pumps and a motor are mounted and in which flow paths for connecting the components are formed, the hydraulic unit includes: a pair of master cylinder connection portions arranged on an upper side of a front side of the modulator block in a lateral direction; a first valve row having a plurality of first valve accommodation bores that are arranged in a rear side of the modulator block in the lateral direction and accommodate the plurality of NO valves; a second valve row having a plurality of second valve accommodation bores that are arranged in the rear side of the modulator block in the lateral direction and accommodate the plurality of NC valves; a pair of low-pressure accumulator bores arranged in a bottom side of the modulator block in the lateral direction; pump accommodation bores arranged between the first valve row and the second valve row, formed in the lateral direction with respect to a direction in which valve accommodation bores are formed, and formed in both sides of the modulator block; motor accommodation bores that are formed between two pump accommodation bores to be perpendicular to the pump accommodation bores and have a motor for driving the pumps inserted into the pump accommodation bores formed in the motor accommodation bores; a pair of shuttle valve (ESV) accommodation bores arranged between the first valve row and the second valve row and connected to a suction side of each of the pump accommodation bores and the master cylinder connection portion; a pair of driving force control valve (TC) accommodation bores arranged between wheel cylinder connection portions formed in the modulator block and the first valve row; and a pair of high-pressure accumulator bores arranged in the modulator block in a longitudinal direction, wherein the pair of high-pressure accumulator bores may be formed to have an arrangement parallel to the motor accommodation bores.

The pair of high-pressure accumulator bores may be formed between the first valve accommodation bores of the first valve row and between the first valve row and the master cylinder connection portion.

The pair of high-pressure accumulator bores may be formed to be orthogonal to the first valve row and a valve row in which a plurality of driving force control valve accommodation bores are formed.

The pair of high-pressure accumulator bores may be connected to the pump accommodation bores through a first flow path connected to a discharge side of each of two pump accommodation bores and a second flow path connected to the first flow path and connected to the pair of high-pressure accumulator bores, and the pair of high-pressure accumulator bores may be configured so that a discharge side of each high-pressure accumulator bore and a driving force control valve accommodation bore are connected to each other through a third flow path.

The first through third flow paths and flow paths formed on the modulator block may be connected to one another in a straight line shape.

An orifice may be formed in the third flow path.

The high-pressure accumulator bores may be connected to the shuttle valve accommodation bores through the driving force control valve accommodation bores.

Cable path bores having an arrangement parallel to the motor accommodation bores may be formed so that a cable may be electrically connected to the motor installed in the motor accommodation bores.

The motor accommodation bores, the pair of high-pressure accumulator bores, and the cable path bores may be arranged in a front side of the modulator block in a longitudinal direction.

The pair of driving force control valve accommodation bores and the shuttle valve accommodation bores may be arranged in the lateral direction, and the first valve accommodation bores, the second valve accommodation bores, the pair of driving force control valve accommodation boars, and the pair of shuttle valve accommodation bores may be formed in a rear side of the modulator block.

The wheel cylinder connection portions may be arranged on a top side of the modulator block in the lateral direction.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
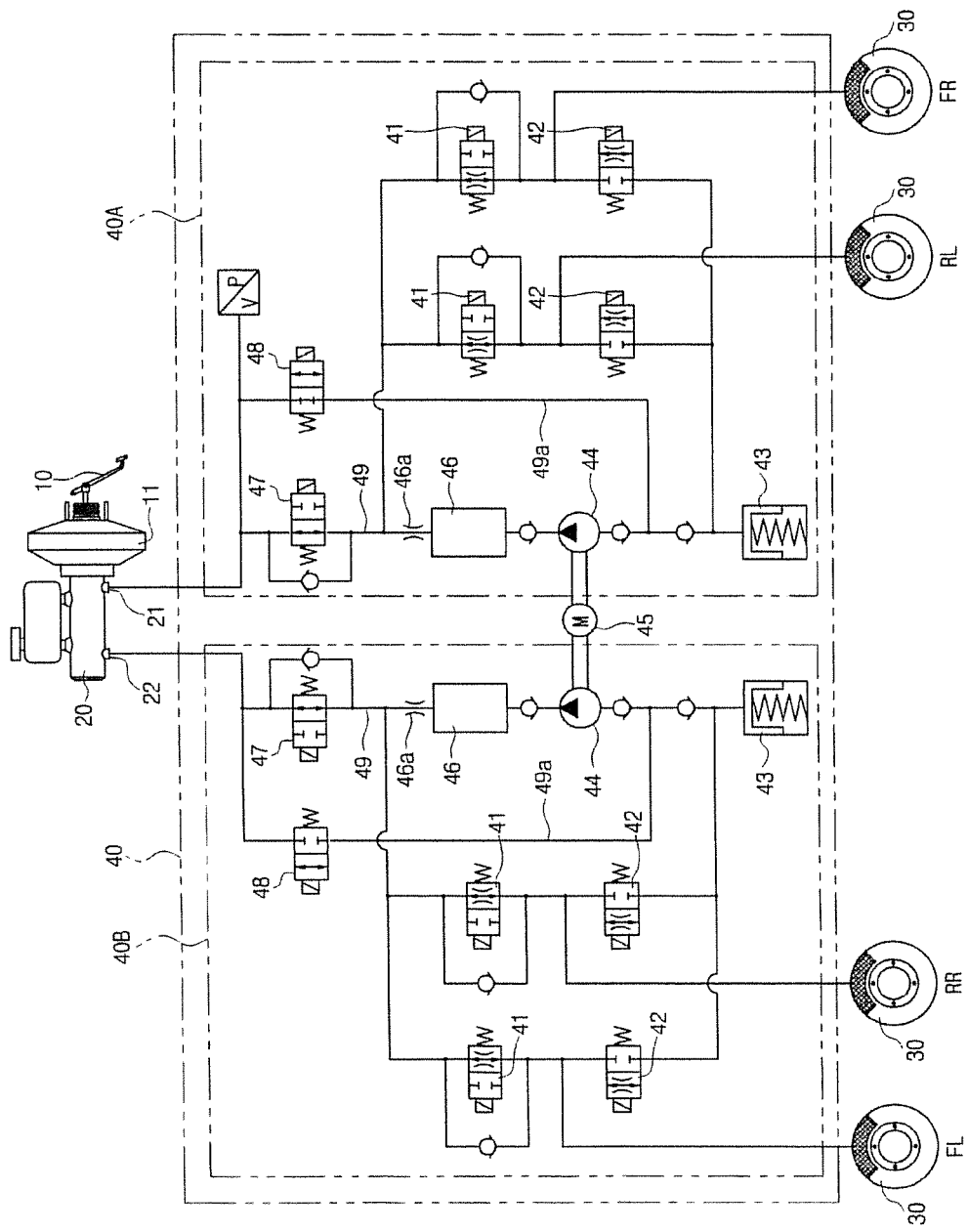
FIG. 1 is a hydraulic circuit diagram schematically illustrating an electronic control brake system according to an embodiment of the present invention.

Hereinafter, exemplary embodiments of the present invention will be described in detail with reference to the accompanying drawings. Prior to this, the terms or words used in the present specification and the claims should not be interpreted to be limited in a common or dictionary sense, and the inventor should interpret his/her own invention to have a meaning and a concept that comply with the technical spirit of the present invention based on a principle that the concept of the terms may be properly defined so as to describe his/her own invention in a best manner. Thus, embodiments described in the specification and configurations shown in the drawings of the specification are merely exemplary embodiments of the present invention, and there may be various modified examples that may replace the embodiments and the drawings of the specification at the time of filing an application of the present invention.

FIG. 1 is a hydraulic circuit diagram schematically illustrating an electronic control brake system according to an embodiment of the present invention.

Referring to FIG. 1, the electronic control brake system according to the present invention includes a modulator block 40 having a hydraulic circuit that controls brake hydraulic pressure formed through a booster 11 linked to a brake pedal 10 and a master cylinder 20 to be transmitted to wheel cylinders 30 installed in wheels FL, FR, RL, and RR. In this case, the hydraulic circuit includes a first hydraulic circuit 40A that controls liquid pressure transmission by connecting a first port 21 of the master cylinder 20 and the wheel cylinders 30 disposed in two wheels FR and RL, and a second hydraulic circuit 40B that controls liquid pressure transmission by connecting a second port 22 of the master cylinder 20 and the wheel cylinders 30 disposed in the remaining, two wheels FL and RR. The first and second hydraulic circuits 40A and 40B are compactly installed in the modulator block 40.

Each of the first hydraulic circuit 40A and the second hydraulic circuit 40B includes a plurality of solenoid valves 41 and 42 for controlling brake hydraulic pressure transmitted to two wheel cylinders 30, a low-pressure accumulator 43 for temporarily storing oil discharged from the wheel cylinder 30, a pair of pumps 44 for pumping the oil at the low-pressure accumulator 43 or the master cylinder 20, a motor 45 for driving the pair of pumps 44, a high-pressure accumulator 46 having an orifice 46a formed in an outlet of the high-pressure accumulator 46 so as to reduce pressure pulsation of the oil that is pressed and discharged by operations of the pumps 44, and a hydraulic line 49 that causes liquid pressure discharged from the high-pressure accumulator 46 or liquid pressure generated in the master cylinder 20 to be optionally transmitted to the wheel cylinder 30 or suction sides of the pumps 44.

That is, as illustrated in FIG. 1, the plurality of solenoid valves 41 and 42, the low-pressure and high-pressure accumulators 43 and 46, the pumps 44, and the hydraulic line 49 are disposed in each of the first and second hydraulic circuits 40A and 40B.

In more detail, the plurality of solenoid valves 41 and 42 are classified into a normal open (NO) type solenoid valve 41 (hereinafter, referred to as a 'NO' valve) that is linked to an upstream side of each of the wheel cylinders 30 and is normally maintained in an open state, and a normal closed (NC) type solenoid valve 42 (hereinafter, referred to as a 'NC' valve) that is linked to a downstream side of each wheel cylinder 30 and is normally maintained in a closed state. Opening/closing operations of the NO/NC valves 41 and 42 are controlled by an electronic control unit (not shown) that detects a speed of a vehicle using a wheel sensor (not shown) disposed in each wheel.

Also, the electronic control brake system includes a bypass flow path 49a that is diverged from the hydraulic line 49 for connecting an outlet of the master cylinder 20 and the high-pressure accumulator 46 and the wheel cylinder 30 and that connects inlets of the pumps 44. A shuttle valve (ESV) 48 is installed in the bypass flow path 49a, is normally maintained in a closed state and then is opened according to opening signals. That is, the bypass flow path 49a guides the oil in the master cylinder 20 to be inhaled into inlets of the pumps 44 according to an operation of the shuttle valve 48.

Also, a driving force control valve (TC NO valve) 47 is installed in the hydraulic line 49 between the outlet of the master cylinder 20 and the outlet of the high-pressure accumulator 46, is normally maintained in an open state and then closes flow paths when road surface slipping occurs in wheels due to quick start of the vehicle so that brake pressure generated by driving the pumps 44 may be transmitted to the wheel cylinders 30 of the wheels and thus brake of the vehicle can be performed even when a driver does not step on the brake pedal 10.

That is, the hydraulic line 49 is firstly connected to the driving force control valve 47 so that hydraulic pressure introduced from the master cylinder 20 may flow toward the driving force control valve 47. The hydraulic line 49 connected to the driving force control valve 47 is connected to the wheel cylinder 30 of each wheel via the NO valve 41, and the bypass flow path 49a diverged from the hydraulic line 49 is connected to a suction portion of the pump 44 via the shuttle valve 48.

The pair of pumps 44 are driven by one motor 45 to have a phase difference of 180° and press the oil at the low-pressure accumulator 43 or the master cylinder 20, thereby pumping the oil toward the high-pressure accumulator 46.

Then, a hydraulic unit disposed in the electronic control brake system having the above configuration will be described in more detail with reference to FIGS. 2 and 3.

Figure 2:
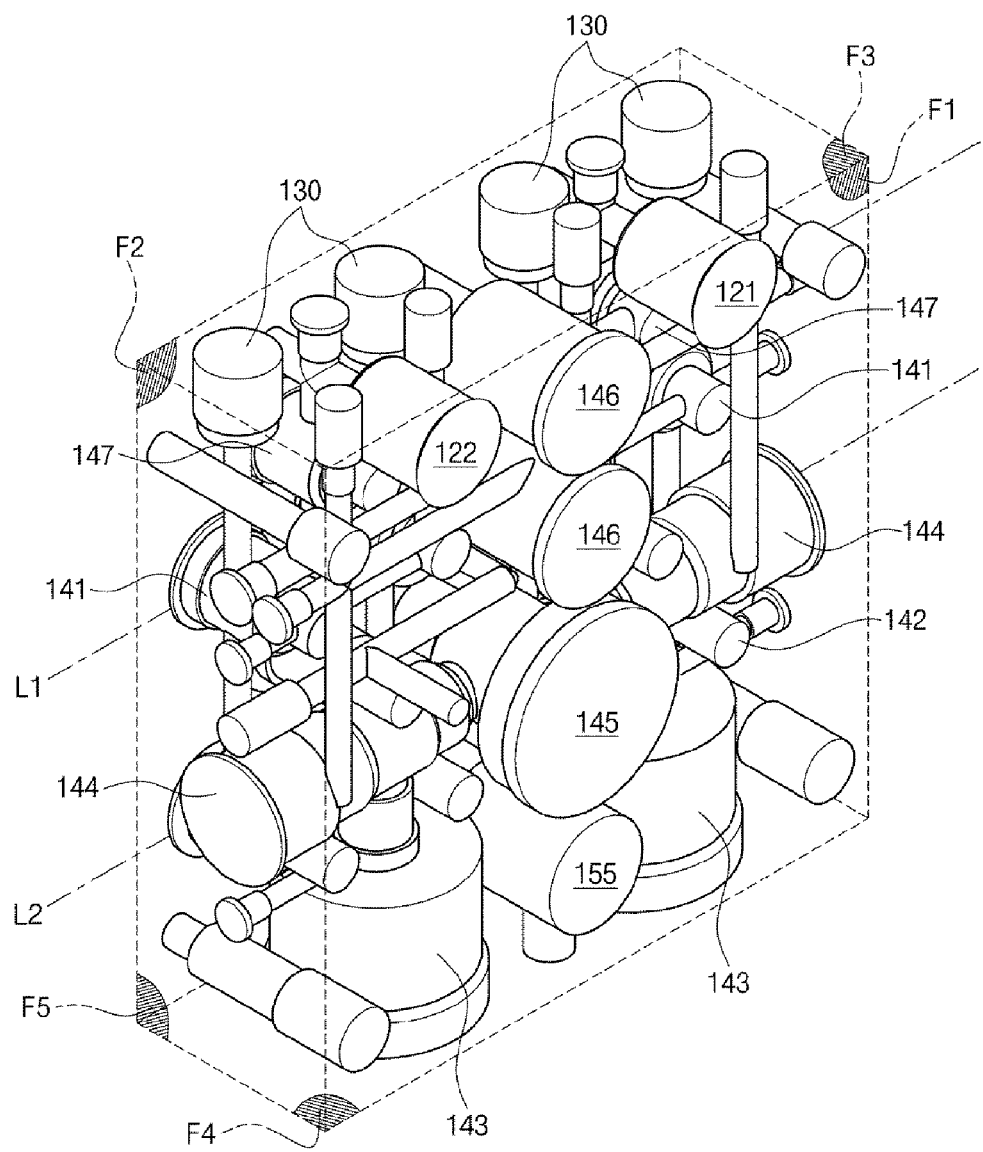
FIG. 2 is a perspective view of a modulator block that constitutes a hydraulic unit of the electronic control brake system according to an embodiment of the present invention.
Figure 3:
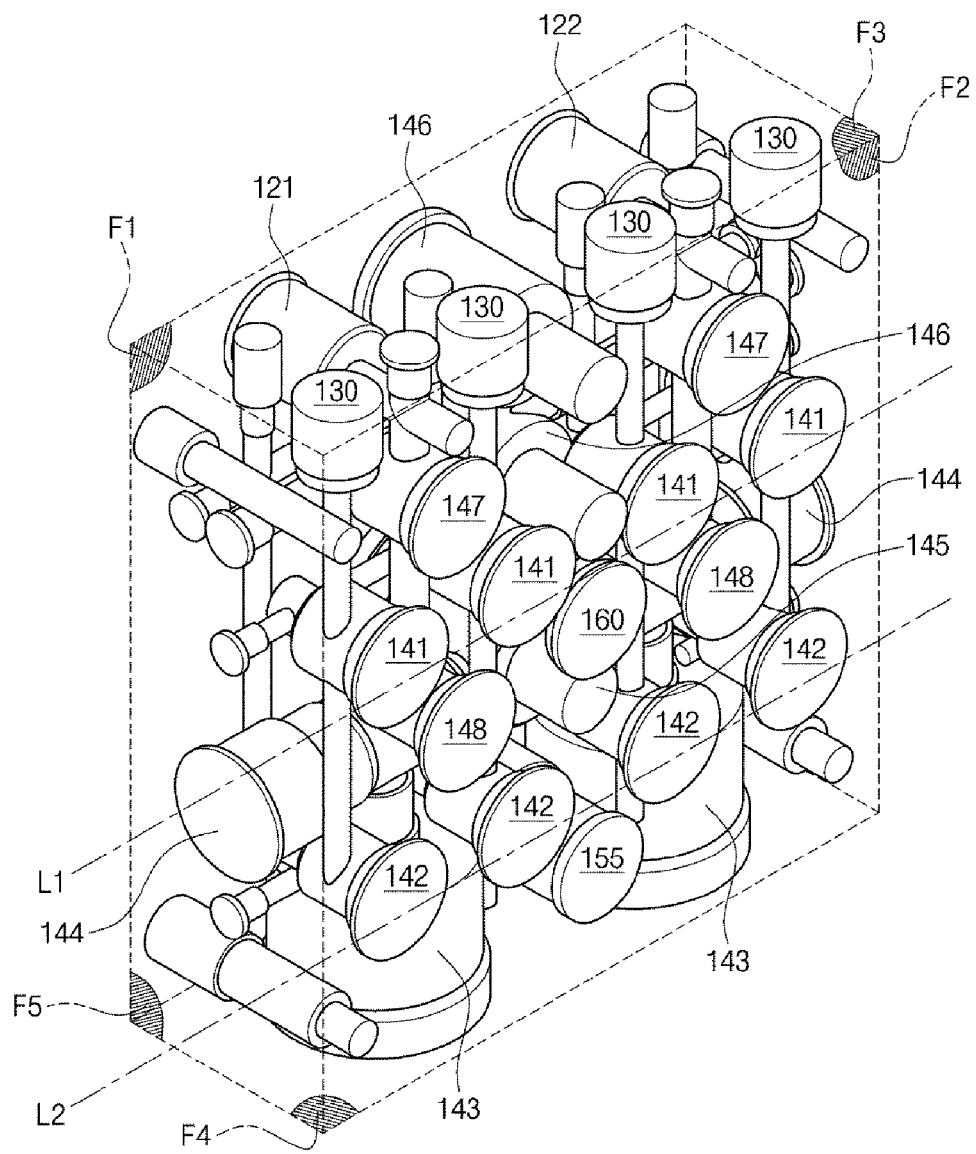
FIG. 3 is a perspective view of a rear of the modulator block illustrated in FIG. 2.

FIG. 2 is a perspective view of a modulator block that constitutes a hydraulic unit of the electronic control brake system according to an embodiment of the present invention, and FIG. 3 is a perspective view of a rear of the modulator block illustrated in FIG. 2. In this case, for understanding of the present invention, a front side F1, a rear side F2, a top side F3, a bottom side F4, and both sides F5 that suggest a direction of the modulator block 40 are set based on the modulator block 40 illustrated in FIG. 2. However, embodiments of the present invention are not limited thereto. It should be understood that sides for suggesting the direction of the modulator block 40 may vary according to a position in which the modulator block 40 is installed.

Referring to FIGS. 1 through 3, the modulator block 40 has a hexahedral shape. A plurality of first valve accommodation bores 141 having a first valve row L1 so that a plurality of NO valves 41 are accommodated in the plurality of first valve accommodation bores 141, and a plurality of second valve accommodation bores 142 having a second valve row L2 so that a plurality of NC valves 42 are accommodated in the plurality of second valve accommodation bores 142, are formed in the modulator block 40. The first and second valve rows L1 and L2 are arranged to be parallel to each other, and each of the plurality of first and second valve accommodation bores 141 and 142 is arranged in the rear side F2 of the modulator block 40 in a lateral direction.

Pump accommodation bores 144 are formed between the first valve row L1 and the second valve row L2 in a horizontal direction. That is, the pump accommodation bores 144 are formed in the both sides F5 of the modulator block 40, respectively, and are formed in a lateral direction with respect to a direction in which the valve accommodation bores 141 and 142 are formed.

Motor accommodation bores 145 are formed between two pump accommodation bores 144 to be perpendicular to the pump accommodation bores 144. The motor 45 for driving the pumps 44 inserted into the pump accommodation bores 144 is installed in the motor accommodation bores 145.

Also, a plurality of wheel cylinder connection portions 130 for transmitting the brake hydraulic pressure to the wheel cylinder 30 of each wheel are arranged on the top side F3 of the modulator block 40 in the lateral direction, and a pair of master cylinder connection portions 121 and 122 to which the brake hydraulic pressure is supplied through the first and second ports 21 and 22 of the master cylinder 20, are arranged at an upper side of the front side F1 in the lateral direction. A pair of low-pressure accumulator bores 143 are arranged on the bottom side F4 of the modulator block 40 in the lateral direction.

Meanwhile, cable path bores 155 having an arrangement parallel to the motor accommodation bores 145 are formed so that a cable may be electrically connected to the motor 45 installed in the motor accommodation bores 145. The cable path bores 155 are arranged on the front side F1 of the modulator block 40 in a longitudinal direction together with the motor accommodation bores 145.

A pair of shuttle valve accommodation bores 148 that accommodate the shuttle valve 48 are arranged between the first valve row L1 and the second valve row L2 and are arranged on the rear side F2 of the modulator block 40 in the lateral direction. The pair of shuttle valve accommodation bores 148 are connected to suction sides of the pump accommodation bores 144 and the master cylinder connection portions 121 and 122.

A pair of driving force control valve accommodation bores 147 for accommodating the driving force control valve 47 are arranged between the wheel cylinder connection portion 130 and the first valve row L1 and are arranged on the rear side F2 of the modulator block 40 in the lateral direction.

The above-described first and second valve accommodation bores 141 and 142, the pump accommodation bores 144, the wheel cylinder connection portion 130, the master cylinder connection portions 121 and 122, the low-pressure accumulator bores 143, the shuttle valve accommodation bores 148, and the driving force control valve accommodation bores 147 are aligned at both sides of the modulator block 40 based on the motor accommodation bores 145 that are central axes of the longitudinal direction. This is because, as described above, the hydraulic pressure transmitted from the master cylinder 20 is formed to control two wheel cylinders 30 through the first and second hydraulic circuits 40A and 40B. Thus, optimum arrangement conditions are formed. The hydraulic line 49 including a plurality of flow paths connected between the master cylinder connection portions 121 and 122 and the wheel cylinder connection portion 130 is formed in the modulator block 40. The hydraulic line 49 is optionally connected to the first and second valve accommodation bores 141 and 142, the pump accommodation bores 144, the low-pressure accumulator bores 143, the shuttle valve accommodation bores 148, the driving force control valve accommodation bores 147, and high-pressure accumulator bores 146 that will be described later.

According to an embodiment of the present invention, a pair of high-pressure accumulator bores 146 are arranged in the modulator block 40 in the longitudinal direction so as to minimize a cost in terms of manufacturing and to optimize the size of the modulator block 40. The pair of high-pressure accumulator bores 146 are formed in the front side F1 of the modulator block 40 so as to have an arrangement parallel to the motor accommodation bores 145. The pair of high-pressure accumulator bores 146 are formed between the first valve accommodation bores 141 of the first valve row L1 and between the first valve row L1 and the master cylinder connection portions 121 and 122, respectively. According to the drawings, the pair of high-pressure accumulator bores 146 are formed to be orthogonal to the first valve row L1 and a valve row in which the plurality of driving force control valve accommodation bores 147 are formed. That is, as the pair of high-pressure accumulator bores 146 are arranged in the longitudinal direction together with the motor accommodation bores 145, the modulator block 40 is partitioned into first and second hydraulic circuits 40A and 40B based on both sides of the modulator block 40.

As described above, the first and second valve accommodation bores 141 and 142, the shuttle valve accommodation bores 148, and the driving force control valve accommodation bores 147 are formed in the rear side F2 of the modulator block 40, and the pair of high-pressure accumulator bores 146 are formed in the front side F1 of the modulator block 40 through spaces formed between the respective bores 141, 142, 147, and 148 so that the size of the modulator block 40 may not be increased and may be optimized compared to a hydraulic unit for installing a high-pressure accumulator according to the related art.

The pair of high-pressure accumulator bores 146 are connected to the pump accommodation bores 144 through a first flow path connected to a discharge side of each of two pump accommodation bores 144 and a second flow path connected to the first flow path and connected to each of the pair of high-pressure accumulator bores 146. Also, the pair of high-pressure accumulator bores 146 are connected to a discharge side of each high-pressure accumulator bore 146 and the driving force control valve accommodation bores 147 through the third flow path. The first through third flow paths and a flow path formed on the modulator block 40 are formed as straight flow paths and are connected to one another.

Meanwhile, the orifice 46a is formed in the third flow path. Also, the high-pressure accumulator bores 146 are connected to the shuttle valve accommodation bores 148 through the driving force control valve accommodation bores 147.

In this case, the flow of the hydraulic pressure in which the liquid pressure discharged from the master cylinder 20 and the pumps 44 is controlled by operations of the high-pressure accumulator 46, the driving force control valve 47 and the shuttle valve 48, has been described above when describing the hydraulic circuit diagram of the electronic control brake system illustrated in FIG. 1. Thus, a detailed description thereof will be omitted.

Meanwhile, an unexplained reference numeral '160' represents pressure sensor (P-Sensor) bores disposed between the first valve row L1 and the shuttle valve accommodation bores 148 and formed in the rear side F2 of the modulator block 40 so as to have an arrangement parallel to the motor accommodation bores 145.

As described above, in a hydraulic unit of an electronic control brake system according to an embodiment of the present invention, a high-pressure accumulator is installed to have an arrangement parallel to a shaft of a motor, and as a space between valve accommodation bores in which valves are accommodated, is utilized and installed, an increase in the size of a modulator block can be minimized by installing the high-pressure accumulator. Thus, manufacturing costs of the hydraulic unit can be reduced.

In addition, in the high-pressure accumulator that receives liquid pressure discharged through pumps, an input port into which the liquid pressure is introduced, and an output port from which the liquid pressure is discharged, are disposed on a straight flow path, respectively, and an orifice is formed in the output port so that processability of the flow paths is facilitated and productivity can be improved. That is, the flow paths that suggest a direction of a flow of the hydraulic pressure are formed in only a straight line shape so that the flow paths can be easily formed in the modulator block.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hydraulic unit of an electronic control brake system comprising a modulator block on which components comprising a plurality of normal open/normal closed (NO/NC) valves for adjusting brake hydraulic pressure supplied to wheels of a vehicle, a driving force control valve, a shuttle valve, a low-pressure/high-pressure accumulator, pumps and a motor are mounted and in which flow paths for connecting the components are formed, the hydraulic unit comprising:
   a pair of master cylinder connection portions arranged on an upper side of a front side of the modulator block in a lateral direction;
   a first valve row having a plurality of first valve accommodation bores that are arranged in a rear side of the modulator block in the lateral direction and accommodate the plurality of NO valves;
   a second valve row having a plurality of second valve accommodation bores that are arranged in the rear side of the modulator block in the lateral direction and accommodate the plurality of NC valves;
   a pair of low-pressure accumulator bores arranged in a bottom side of the modulator block in the lateral direction;
   pump accommodation bores arranged between the first valve row and the second valve row, formed in the lateral direction with respect to a direction in which valve accommodation bores are formed, and formed in both sides of the modulator block;
   motor accommodation bores that are formed between two pump accommodation bores to be perpendicular to the pump accommodation bores and have the motor for driving the pumps inserted into the pump accommodation bores formed in the motor accommodation bores;
   a pair of shuttle valve (ESV) accommodation bores arranged between the first valve row and the second valve row and connected to a suction side of each of the pump accommodation bores and the master cylinder connection portions;
   a pair of driving force control valve (TC) accommodation bores arranged between wheel cylinder connection portions formed in the modulator block and the first valve row; and
   a pair of high-pressure accumulator bores arranged in the modulator block in a longitudinal direction,
   wherein the pair of high-pressure accumulator bores are formed to have an arrangement parallel to the motor accommodation bores.

2. The hydraulic unit of claim 1, wherein the pair of high-pressure accumulator bores are formed between the first valve accommodation bores of the first valve row and between the first valve row and the master cylinder connection portions.

3. The hydraulic unit of claim 2, wherein the pair of high-pressure accumulator bores are formed to be orthogonal to the first valve row and a valve row in which a plurality of driving force control valve accommodation bores are formed.

4. The hydraulic unit of claim 1, wherein the pair of high-pressure accumulator bores are connected to the pump accommodation bores through a first flow path connected to a discharge side of each of two pump accommodation bores and a second flow path connected to the first flow path and connected to the pair of high-pressure accumulator bores, and the pair of high-pressure accumulator bores are configured so that a discharge side of each high-pressure accumulator bore and a driving force control valve accommodation bore are connected to each other through a third flow path.

5. The hydraulic unit of claim 4, wherein the first through third flow paths and flow paths formed on the modulator block are connected to one another in a straight line shape.

6. The hydraulic unit of claim 4, wherein an orifice is formed in the third flow path.

7. The hydraulic unit of claim 4, wherein the high-pressure accumulator bores are connected to the shuttle valve accommodation bores through the driving force control valve accommodation bores.

8. The hydraulic unit of claim 1, wherein cable path bores having an arrangement parallel to the motor accommodation bores are formed so that a cable is capable of being electrically connected to the motor installed in the motor accommodation bores.

9. The hydraulic unit of claim 8, wherein the motor accommodation bores, the pair of high-pressure accumulator bores, and the cable path bores are arranged in a front side of the modulator block in a longitudinal direction.

10. The hydraulic unit of claim 1, wherein the pair of driving force control valve accommodation bores and the shuttle valve accommodation bores are arranged in the lateral direction, and the first valve accommodation bores, the second valve accommodation bores, the pair of driving force control valve accommodation bores, and the pair of shuttle valve accommodation bores are formed in the rear side of the modulator block.

11. The hydraulic unit of claim 1, wherein the wheel cylinder connection portions are arranged on a top side of the modulator block in the lateral direction.

* * * * *